UNITED STATES PATENT OFFICE.

JESSE B. WEBB, OF SAN ANTONIO, TEXAS.

CANDY AND PROCESS OF MAKING SAME.

SPECIFICATION forming part of Letters Patent No. 676,707, dated June 18, 1901.

Application filed April 10, 1901. Serial No. 55,235. (No specimens.)

*To all whom it may concern:*

Be it known that I, JESSE B. WEBB, a citizen of the United States, residing at San Antonio, in the county of Bexar and State of Texas, have invented new and useful Improvements in Candies and Processes for Making Same, of which the following is a specification.

This invention relates to confectionery, and has for its object to provide a novel candy, which I term "fruit or nut taffy," comprising two distinct kinds of candy, which are separately manufactured and afterward combined in a single article or piece of confectionery, whereby each part retains its distinctive features and characteristics, but the two combine to afford to the consumer a candy of the desired consistency and edible peculiarities and a delicious flavor.

To this end my invention consists in a candy compounded of the ingredients and in the manner hereinafter described, and particularly pointed out in the claims following the description.

In making my improved confectionery I make up separately two distinct batches or masses of candy, the first of which consists of the following ingredients in substantially the proportions stated, viz: (a) glucose, three and one-half pounds; granulated sugar, six and one-half pounds; butter, six ounces; paraffin, two ounces; gelatin, one ounce; tartaric acid, (in solution,) one-half ounce; flavoring extract, one ounce; water, one pint; or (b) fruit, five pounds; granulated sugar, two pounds; water, one-half pint; or nuts, four pounds; granulated sugar, three pounds; water, one-half pint.

To make the first-named batch or mass of candy, put the granulated sugar, glucose, butter, paraffin, and water in a kettle and cook until it reaches a temperature of 240°. Place the gelatin in a pan of cool water and let it soak for thirty minutes. When the first-named batch has cooked to 240°, remove the gelatin from the water and put it into the batch and let the whole cook to a temperature of 255°, when the kettle should be removed from the fire or heater. Then stir in the tartaric-acid solution, after which pour out the batch or mass on a well-greased confectioner's slab, turn in the edges until sufficiently cool, and "pull" the same. During the last half of the pulling operation pour the flavoring extract onto the batch in small quantities at a time. The batch thus made I term the "taffy" batch. The other batch I term "fruit" or "nut" batch, in making which I proceed as follows: Grind five pounds of fruit fine. Place two pounds of granulated sugar and one-half pint of water in a kettle and cook to a temperature of 220°. Then stir in the ground fruit until it takes up the syrup or is thoroughly mixed therewith, after which remove the kettle from the heater and keep warm until it is ready to be combined with the taffy batch. After the taffy batch has been spread upon the slab, as before described, remove the fruit batch from the kettle and place it in the center of the taffy batch, then roll the latter about the fruit batch and place before a batch-warmer for a short while. Finally the mass may be cut into suitable sizes or pieces, each piece comprising a covering of the taffy batch and a filling of the fruit batch, or the two batches may be arranged as layers and cut into suitable pieces. In either case the piece of candy will consist of two distinct but attached parts—one, the taffy, which gives body and consistency to the candy, and the other the fruit mixture, which gives to the candy a rich fruity flavor.

Instead of the fruit mixture described the second batch may be made by substituting ground nuts for the fruit and proceeding in the manner before described. If desired, glucose may be added to the fruit or nut batch.

The candy made as described may be cut or fashioned into various shapes, forms, or pieces of any desired size, provided that the taffy batch is distinct from the fruit or nut batch. In both the fruit and nut batches the fruit or nuts form a flavoring base and the sugar, or the sugar and glucose, constitute the candy-vehicle.

The tartaric acid in the taffy batch prevents the taffy from granulating, and to make the tartaric-acid solution I take four ounces of crystal tartaric acid and dissolve in one pint of hot water.

Instead of the glucose or sugar employed in the taffy batch molasses or honey may be substituted, and likewise glucose may be substituted for the granulated sugar in the fruit or nut batch without departing from the spirit of my invention; but the two batches are preferably made in accordance with the formulæ above set forth to produce a high grade of candy.

Having described my invention, what I claim is—

1. A candy consisting of two distinct batches united in a single piece, one batch comprising glucose, sugar, an oleaginous substance, paraffin, gelatin and tartaric acid, and the other batch comprising a flavoring base and sugar, substantially as described.

2. A candy consisting of two distinct batches united in a single piece, one batch comprising glucose, sugar, butter, paraffin, gelatin and tartaric acid, and the other batch comprising fruit and sugar, the ingredients being compounded in substantially the proportions and manner specified.

3. The herein-described process of making candy consisting in cooking to a determinate temperature a batch comprising glucose, sugar, butter, paraffin, gelatin, tartaric acid and water, cooking at a lower temperature another batch comprising a flavoring base and sugar, then uniting said batches to form two separate but attached parts, and finally cutting said attached parts into pieces of suitable size and shape, substantially in the manner specified.

In testimony whereof I have hereunto set my hand in presence of two subscribing witnesses.

JESSE B. WEBB.

Witnesses:
T. D. COBBS,
J. JACOBS.